M. H. ARNOLD.
LUBRICATING DEVICE.
APPLICATION FILED OCT. 19, 1912.

1,111,124. Patented Sept. 22, 1914.

Witnesses:
Harry S. Gaither
A. L. Walton

Inventor:
Matthew H. Arnold
By Sheridan, Wilkinson, Scott & Richmond
Attys

UNITED STATES PATENT OFFICE.

MATTHEW H. ARNOLD, OF BUTTE, MONTANA.

LUBRICATING DEVICE.

1,111,124.

Specification of Letters Patent. Patented Sept. 22, 1914.

Application filed October 19, 1912. Serial No. 726,796.

*To all whom it may concern:*

Be it known that I, MATTHEW H. ARNOLD, a citizen of the United States, residing at Butte, in the county of Silverbow and State of Montana, have invented certain new and useful Improvements in Lubricating Devices, of which the following is a specification.

This invention relates to improvements in lubricating devices, and has for its object to provide an improved lubricating device which will be capable of attachment in any bearing, journal, or other frictionally contacting surfaces, where lubrication is required.

Another object is to provide a lubricating device which will permit the ready insertion of an oil spout or grease gun, and will prevent the entrance of dust or dirt.

Other objects will be made apparent and set forth in the following specification and accompanying drawing, in which—

Figure 1:
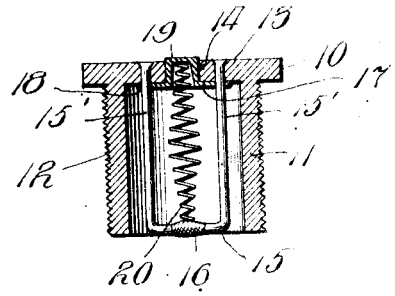
Figure 2:
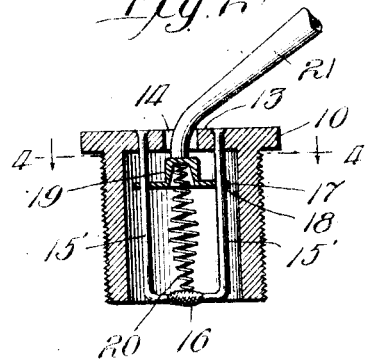
Figure 3:
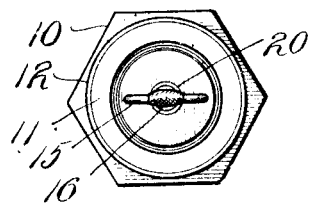
Figure 4:
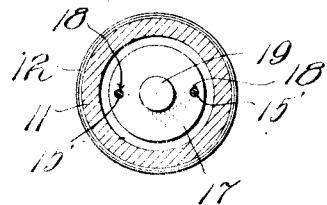

Figure 1 is a longitudinal section of my improved device, showing the same in closed position; Fig. 2, a view similar to Fig. 1, showing the open position with an oil spout inserted therethrough; Fig. 3, an inverted plan view of Fig. 1; Fig. 4, a transverse section along the line 4, 4 of Fig. 2; and Fig. 5, a side elevation of a modification.

Like numerals refer to like elements throughout the drawings, in which—

10 designates a plug having a depending sleeve 11 externally threaded, as indicated at 12. The plug is formed with a flanged head 13 centrally apertured at 14. Secured to the head 13 and depending downwardly therefrom inside the sleeve 11 is the yoke 15 having the arms 15'. This yoke is provided with an enlarged portion 16 intermediate the arms 15'. A cap 17 having the apertures 18 embracing the arms 15' of the yoke 15 is slidably mounted on the latter, as shown in Figs. 1 and 2. This cap 17 is provided with a centrally raised portion 19 adapted to closely fit into and close the aperture 14 in the head 13 of plug 10. A spring 20 having one end resting on and secured to the enlarged portion 16 of the yoke 15, extends upwardly therefrom and has its other extremity seated in the centrally raised portion 19 of the head 17. It will be seen that this spring normally tends to retain the cap 14 in its closed position, as shown in Fig. 1. The plug is adapted to be threadedly attached to a lubricating aperture, the head 10 of said plug being formed with a hexagonal contour, as shown in Fig. 3, to permit ready engagement by a wrench, or the like, with which said plug may be attached to or detached from its permanent location. When it is desired to lubricate, the spout 21 of an oil can, grease gun, or the like, may be pressed downwardly on the centrally raised portion 19 of the cap 17 and the oil permitted to flow downwardly over said cap 17 to the bearing, or the like. Upon removal of the spout 21, the spring 20 will force the cap 17 back to closed position—as indicated in Fig. 1—in which position the entrance of dust or dirt is prevented.

Figure 5:
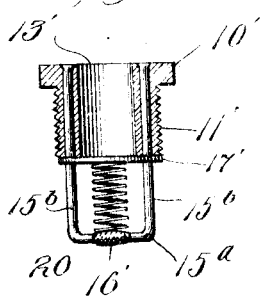

In Fig. 5 I have illustrated a modification in which the plug 10' having the apertured head 13' and externally threaded sleeve 11' is provided with the yoke 15ª having the arms 15ᵇ depending downwardly from and secured to the sleeve 11'. The yoke 15 is provided with the enlarged portion 16' to which is secured and upon which rests one end of the spring 20'. A cap 17' of a diameter approximately equal to the external diameter of the sleeve 11' is apertured so as to be slidably mounted upon the arms 15ᵇ of the yoke 15ª. The upper end of the spring 20' is in contact with the under surface of cap 17' and is adapted to retain the same in closed position, as illustrated in Fig. 5. The operation of this modification is the same as that of the preferred form.

While I have described and shown my invention in more or less particularity, I do not wish to be unduly restricted to such description and showing beyond the scope of the appended claims.

What I claim is:

1. In a device of the class described, an integral plug comprising a threaded sleeve portion and a head carried thereby, said plug being apertured, a closure for said aperture, guiding means comprising rods depending from said head in the direction taken by said sleeve, said closure being slidably mounted on said rods, and means to normally maintain said closure in position closing said aperture.

2. In a device of the class described, a plug, said plug being provided with a lubricating aperture, a yoke comprising arms carried by said plug, a cap mounted on said yoke and adapted to close said aperture, and means carried by said yoke to normally retain said cap in closing position.

3. In a device of the class described, a plug, said plug being provided with a lubricating aperture, a yoke comprising arms depending from and secured to said plug, a cap slidably mounted upon the arms of said yoke, and means carried by said yoke and adapted normally to retain said cap in closing position with respect to said lubricating aperture.

4. In a device of the class described, a plug comprising an externally threaded cylindrical sleeve carrying a flanged head at one end, said head being provided with a lubricating aperture, a yoke comprising rods carried by said plug, a cap mounted on said yoke and having an upwardly extending portion adapted to close said aperture, and means carried by said yoke to normally retain said cap in closing position.

5. In a device of the class described, a plug, said plug comprising a depending sleeve and a flanged head, said head being apertured, a yoke comprising arms carried by said head and extending downwardly therefrom, and a cap slidably carried by said yoke and adapted to close the aperture in said cap.

6. In a device of the class described, a plug, said plug comprising a depending sleeve and a flanged head, said head being apertured, a yoke comprising arms carried by said head and extending downwardly therefrom, a cap slidably carried by said yoke and adapted to close the aperture in said cap, and a spring carried by said yoke and contacting with the lower side of said cap, whereby the latter is normally retained in closing position with respect to said aperture.

7. In a device of the class described, a plug, said plug being provided with a lubricating aperture, a yoke comprising guide rods secured to said plug, a cap mounted on said yoke and adapted to close said aperture, and means carried by said yoke to normally secure said cap in closing position.

8. In a device of the class described, a plug, said plug being provided with a lubricating aperture, a yoke comprising arms depending from and secured to said plug, a cap slidably journaled upon the arms of said yoke, and means carried by said yoke to normally retain said cap in closing position.

9. In a device of the class described, a plug comprising an externally threaded cylindrical sleeve carrying a flanged head at one end, said head being provided with a lubricating aperture opening into said sleeve, a yoke comprising a U-shaped rod having its ends secured to said plug, a cap slidably journaled on the arms of said yoke and having an upwardly extending portion adapted to close said lubricating aperture, and a spring carried between said cap and said yoke whereby said cap is normally retained in closing position.

In testimony whereof, I have subscribed my name.

MATTHEW H. ARNOLD.

Witnesses:
CHAS. I. HUGHES,
FERD BOWEN.